United States Patent
Oh et al.

(10) Patent No.: US 11,890,961 B2
(45) Date of Patent: Feb. 6, 2024

(54) APPARATUS FOR MANAGING POWER OF ELECTRIC VEHICLE AND METHOD THEREOF

(71) Applicants: Hyundai Motor Company, Seoul (KR); Kia Motors Corporation, Seoul (KR)

(72) Inventors: Da Ye Oh, Gyeonggi-do (KR); Ki Suk Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 956 days.

(21) Appl. No.: 16/802,108

(22) Filed: Feb. 26, 2020

(65) Prior Publication Data

US 2021/0053460 A1 Feb. 25, 2021

(30) Foreign Application Priority Data

Aug. 21, 2019 (KR) .................. 10-2019-0102681

(51) Int. Cl.
| | |
|---|---|
| B60L 55/00 | (2019.01) |
| B60R 25/24 | (2013.01) |
| B60L 58/14 | (2019.01) |
| B60L 1/00 | (2006.01) |

(52) U.S. Cl.
CPC .............. *B60L 55/00* (2019.02); *B60L 1/006* (2013.01); *B60L 58/14* (2019.02); *B60R 25/241* (2013.01)

(58) Field of Classification Search
CPC ......... B60L 1/006; B60L 58/14; B60R 25/241
USPC ........................................................ 701/22
See application file for complete search history.

(56) References Cited

U.S. PATENT DOCUMENTS

| | | | | |
|---|---|---|---|---|
| 9,227,581 | B1 * | 1/2016 | Gauthier | G07C 5/0808 |
| 2009/0303204 | A1 * | 12/2009 | Nasiri | A63F 13/211 |
| | | | | 345/184 |
| 2012/0007367 | A1 * | 1/2012 | Chang | H02P 23/06 |
| | | | | 290/1 R |
| 2012/0255799 | A1 * | 10/2012 | Kohler | B60L 58/20 |
| | | | | 180/65.245 |
| 2013/0346338 | A1 * | 12/2013 | Burns | G06Q 10/0833 |
| | | | | 705/333 |

(Continued)

FOREIGN PATENT DOCUMENTS

WO WO-2017136593 A2 * 8/2017 ........... B64C 39/024

*Primary Examiner* — Jacob S. Scott
*Assistant Examiner* — Michael E Butler
(74) *Attorney, Agent, or Firm* — Fox Rothschild LLP (57) ABSTRACT

An apparatus for managing power of an electric vehicle and a method thereof are provided. The apparatus determines whether a user participates in a leisure activity based on surrounding information of the electric vehicle, and supplies power when a plug is connected to an outlet provided in the electric vehicle while entering a leisure mode to allow the user to use the outlet during leisure activities. The apparatus includes an information collector that collects surrounding information of the electronic vehicle, and a controller that determines whether a user is performing a leisure activity based on the surrounding information of the electric vehicle collected by the information collector and adjusts power supply based on whether an outlet provided in the electric vehicle is plugged in in a leisure mode indicating that the user is performing a leisure activity.

20 Claims, 7 Drawing Sheets

(56) References Cited

U.S. PATENT DOCUMENTS

2016/0185241 A1\* 6/2016 Kinomura ............... B60L 58/40
  180/65.245
2018/0141456 A1\* 5/2018 Maeda .................. B60W 20/00
2019/0077007 A1\* 3/2019 Mallinson ............. A61B 5/1118
2019/0283731 A1\* 9/2019 Mazaira .............. B60W 50/085

\* cited by examiner

APPARATUS FOR MANAGING POWER OF ELECTRIC VEHICLE AND METHOD THEREOF

CROSS-REFERENCE TO RELATED APPLICATION

This application claims the benefit of priority to Korean Patent Application No. 10-2019-0102681, filed on Aug. 21, 2019 the entire contents of which are incorporated herein by reference.

TECHNICAL FIELD

The present disclosure relates to a technology for supplying or blocking power to an outlet in a leisure mode in an electric vehicle, and more particularly, to an apparatus and method for managing power of an electric vehicle to determine whether a user participates in a leisure activity based on surrounding information of the electric vehicle.

BACKGROUND

In general, since an electric vehicle does not have a separate power button, a power management device provided within the electric vehicle automatically turns the power of the electric vehicle on or off when a particular condition is met. When a driver seat door is open and indoor authentication of a smart key (which is located inside a vehicle) is completed, all doors are closed after the doors other than the driver seat door are opened and the indoor authentication of the smart key is completed. The indoor authentication of the smart key is completed when a parking (P) stage button is pressed and a power management device turns on the power of an electric vehicle (e.g., power is supplied to an electric load).

In recent years, as leisure activities such as camping, fishing, and the like are become more popular, an outlet has been mounted on an inside or outside of an electric vehicle to use the power of the electric vehicle for leisure. However, as described above, using the power of the electric vehicle for leisure through the outlet is complex thus increasing user inconvenience. Accordingly, a conventional power management device for an electric vehicle does not provide a leisure mode in which a user is enabled to easily use an outlet.

The matters described in this section are intended to promote an understanding of the background of the present disclosure and may include matters that are not already known to those of ordinary skill in in the art.

SUMMARY

The present disclosure provides an apparatus for managing power of an electric vehicle and a method thereof which may determine whether a user participates in a leisure activity based on surrounding information of the electric vehicle, and supply power when a plug is connected to an outlet provided in the electric vehicle while entering a leisure mode, thereby allowing the user to easily use the outlet during leisure activities.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for managing power of an electric vehicle may include an information collector configured to collect surrounding information of the electric vehicle, and a controller configured to determine whether a user is performing a leisure activity based on the surrounding information of the electric vehicle collected by the information collector and adjust power supply based on whether an outlet provided in the electric vehicle is plugged in, in a leisure mode indicating that the user is performing a leisure activity. In particular, the outlet may be mounted on an inside of the electric vehicle.

The controller may be configured to supply power to the outlet when a driver seat door is opened and the outlet is plugged in in the leisure mode. In particular, the controller may be configured to output a notification to the user indicating that power is being supplied to the outlet. Additionally, the controller may be configured to block the power supply when a drivable distance of the electric vehicle is less than a distance to a nearest charging station while the power is supplied to the outlet. In particular, the controller may be configured to output a notification to the user indicating that the power supplied to the outlet is blocked. The controller may then be configured to stop the power supply when a blocking signal is received from a smart key.

The controller may be configured to supply power to the outlet when a passenger seat door or a rear seat door is opened in the leisure mode, indoor authentication of a smart key possessed by the user is completed, and the outlet is plugged in. In particular, the controller may be configured to output a notification to the user indicating that the power is supplied to the outlet. The controller may be configured to block the power supply when a drivable distance of the electric vehicle is less than a distance to a nearest charging station while the power is supplied to the outlet. In particular, the controller may be configured to output a notification to the user indicating that the power supplied to the outlet is blocked.

The controller may be configured to stop the power supply when a blocking signal is received from a smart key. The controller may also be configured to supply power to the outlet mounted on an outside of the electric vehicle when the outlet is plugged in and a permission signal is received from an input button mounted on an inside of the electric vehicle. In particular, the controller may be configured to output a notification to the user indicating that power is being supplied to the outlet. The controller may be configured to block the power supply when a drivable distance of the electric vehicle is less than a distance to a nearest charging station while the power is supplied to the outlet. Additionally, the controller may be configured to output a notification to the user indicating that the power supplied to the outlet is blocked. The controller may be configured to stop the power supply when a blocking signal is received from a smart key.

According to another aspect of the present disclosure, a method of managing power of an electric vehicle may include collecting surrounding information of the electric vehicle, determining whether a user is performing a leisure activity based on the collected surrounding information of the electric vehicle, and adjusting power supply based on whether an outlet provided in the electric vehicle is plugged in in a leisure mode indicating that the user is performing the leisure activity.

The adjusting of the power may include supplying power to an outlet mounted on an inside of the electric vehicle when a driver seat door is opened and the outlet mounted on the inside of the electric vehicle is plugged in in the leisure mode, supplying power to the outlet mounted on the inside of the electric vehicle when a passenger seat door or a rear seat door is opened in the leisure mode, indoor authentication of a smart key possessed by the user is completed, and the outlet mounted on the inside of the electric vehicle is plugged in, and supplying power to an outlet mounted on an outside of the electric vehicle when the outlet mounted on the outside of the electric vehicle is plugged in and a permission signal is received from an input button mounted on the inside of the electric vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
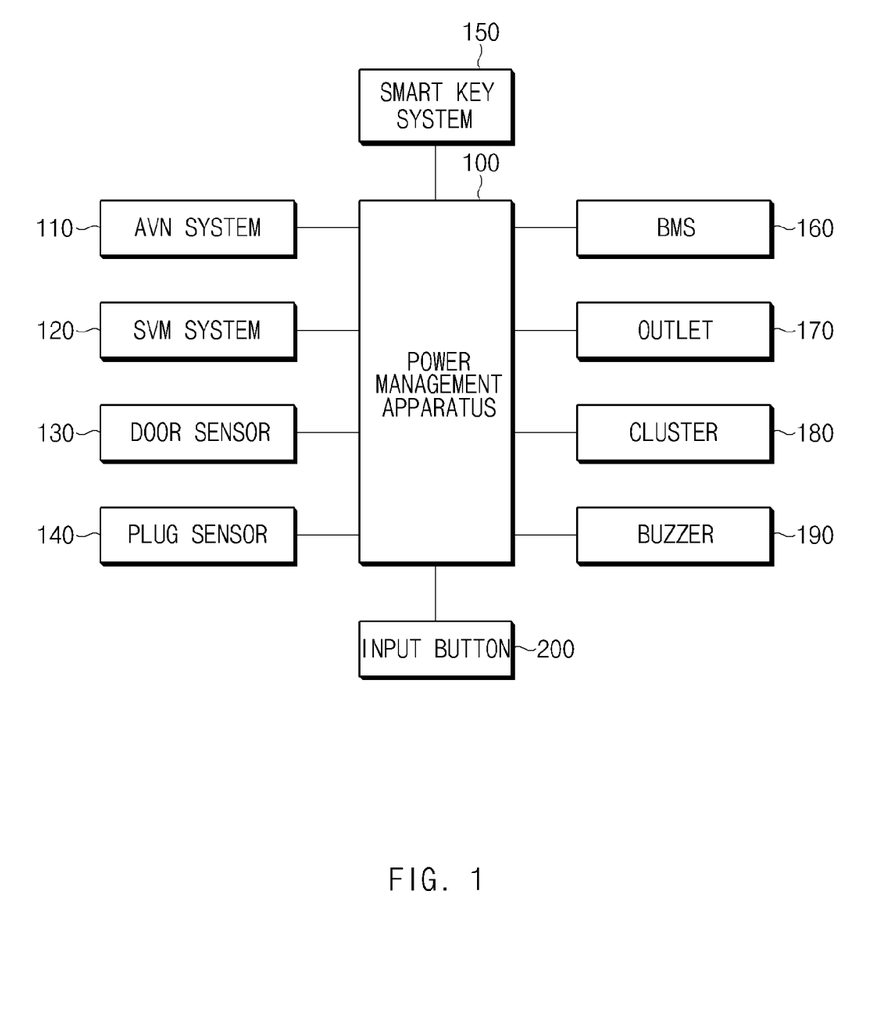
FIG. 1 is a view illustrating a configuration of a power management system for an electric vehicle to which an exemplary embodiment of the present disclosure is applied.

FIG. 1 is a view illustrating a configuration of a power management system for an electric vehicle to which an exemplary embodiment of the present disclosure is applied. As illustrated in FIG. 1, a power management system for an electric vehicle to which an exemplary embodiment of the present disclosure is applied may include a power management apparatus 100, an audio video navigation (AVN) system 110, a surround view monitoring (SVM) system 120, a door sensor 130, a plug sensor 140, a smart key system 150, a battery management system (BMS) 160, an outlet 170, a cluster 180, a buzzer 190, and an input button 200.

Each component except for the power management apparatus 100 is mounted within an electric vehicle. Hereinafter, only basic functions of each component will be described, but the exemplary embodiment is not necessarily limited thereto. First, the AVN system 110, which is a multimedia system for an electric vehicle into which an audio system, a video system and a navigation system are integrated in one unit form, may provide a user with convenience in operating various multimedia devices and enable an internal space of an electric vehicle to be effectively utilized.

In particular, the navigation system may provide current location information (such as camping ground, fishing ground, or the like) of the electric vehicle to the power management apparatus 100 based on map data. In other words, the navigation system may provide the power management apparatus 100 with information used to determine whether a current location of the electric vehicle is a location for leisure activities. In addition, the navigation system may provide the power management apparatus 100 with charging station information (such as a location, a distance, price, business hours, and the like) of the electric vehicle.

Such a navigation system may include a global positioning system (GPS) module for receiving a global positioning system (GPS) signal from a satellite to generate first location data based on the received GPS signal, a dead reckoning (DR) sensor configured to generate second location data based on a driving direction and a speed of the electric vehicle, a memory configured to store map data and various information, and a map matching device configured to estimate a location of the electric vehicle based on the first and second location data, match the estimated location of the electric vehicle with a link (e.g., a map matching link or a map matching road) in the map data, and output the matched map information (map matching result).

The SVM system 120 may be configured to generate a support vector machine (SVM) image and provide the SVM image to the power management apparatus 100. For example, the SVM system 120 may include a camera, a view converter, and an SVM controller. The camera, which is an image capturing device configured to capture an image around the electric vehicle, may include a front camera, a rear camera, a left camera, and a right camera. The camera, which is an essential component included in the SVM system 120, is tuned to capture an optimal SVM image.

The front camera may be disposed in front of the electric vehicle and used to obtain a front image of the electric vehicle. In particular, the front camera may be disposed at a central portion between both headlamps of the electric vehicle, but is not limited thereto. The rear camera may be disposed at the rear of the electric vehicle and used to obtain a rear image of the electric vehicle. In particular, the rear camera may be disposed at a central portion between both rear lamps of the electric vehicle, but is not limited thereto.

The left camera may be disposed on the left side surface of the electric vehicle and used to obtain the left image of the electric vehicle. In particular, the left camera may be disposed under the left side mirror of the electric vehicle, but is not limited thereto. The right camera may be disposed on the right side surface of the electric vehicle and used to obtain the right image of the electric vehicle. In particular, the right camera may be disposed under the right side mirror of the electric vehicle, but is not limited thereto.

The view converter may be configured to generate an SVM image using the images captured by each camera. The generated SVM image is atop view image. The SVM controller may be configured to perform various controls required in an operation of generating the SVM image. The door sensor 130, which is a sensor configured to detect the opening and closing of each door of the electric vehicle, may include a driver seat door sensor, a passenger seat door sensor, and a rear seat door sensor.

The plug sensor 140 may be configured to detect the connection of the plug to the outlet 170 and provide the detection information to the power management apparatus 100. For example, the plug sensor 140 may include a pin located at an inlet of the outlet 170 and thus, the plug sensor 140 may utilize a principle of detecting a plug-in through the pressing of the pin while the plug is plugged into the outlet 170. The smart key system 150 may be mounted on the electric vehicle to authenticate the smart key of the user and detect the location of the smart key (e.g., indoor or outdoor of the vehicle), may include, for example, a low frequency (LF) transmitter, a radio frequency (RF) receiver, an electronic control unit (ECU), and the like.

The LF transmitter may be configured to modulate an LF carrier signal and periodically transmit a communication request signal through an LF antenna. The RF receiver may be configured to receive an RF signal from the smart key. The ECU may be configured to detect the location information of the LF antenna and the electric field intensity of the RF signal based on the RF signal received by the RF receiver and estimate the location of the smart key. In other words, the ECU may be configured to estimate the distances (e.g., location of the smart key) from each antenna to the smart key based on the intensity of the RF signal. The BMS 160 may be configured to detect information regarding the voltage, current, temperature and the like of a high-voltage battery provided in the electric vehicle to manage the state of charge (SOC).

The outlet 170 allows the user to use the power for leisure and may include at least one outlet mounted on an inside of the electric vehicle and at least one outlet mounted on an outside (outdoor) of the electric vehicle. For reference, the outlet 170 refers to an outlet for supplying power to a load device in a power distribution system of an electric vehicle. The cluster 180, which is a display mounted within the electric vehicle to provide a variety of information to the user, may be configured to display that the power for leisure is supplied through the outlet 170. The buzzer 190, which is a type of horn, may be configured to output a warning sound indicating that the power for leisure supplied through the outlet 170 has been blocked.

The input button 200 may be mounted on an inside of the electric vehicle, and when pressed by the user, the power management apparatus 100 may be configured to determine that the user permits to apply power to the outlet 170 mounted on the outside of the electric vehicle. In other words, the input button 200 prevents others from arbitrarily using the outlet 170 located outside the electric vehicle.

The power management apparatus 100, that performs a core function of the exemplary embodiment, may be configured to determine whether the user participates in a leisure activity based on the surrounding information of the electric vehicle, and when the plug is connected to the outlet provided in the electric vehicle when the power management apparatus 100 enters the leisure mode, the power management apparatus 100 may be configured to perform various controls required in the process of supplying power. The power management apparatus 100 may be configured to transmit and receive information to and from all or some of the components via the vehicle network. In particular, the vehicle network may include a controller area network (CAN), a local interconnect network (LIN), FlexRay, a media oriented systems transport (MOST), Ethernet, and the like.

The power management apparatus 100 may be configured to determine whether the user participates in a leisure activity based on the current location information (e.g., camping ground, fishing ground, or the like) of the electric vehicle obtained through the AVN system 110. In other words, when the electric vehicle is located at a leisure activity place such as a camping ground, a fishing ground, or the like, the power management apparatus 100 may be configured to determine that the user participates in a leisure activity.

Particularly, the power management apparatus 100 may be configured to determine whether the user participate in a leisure activity based on the SVM image obtained using the SVM system 120. In other words, the power management apparatus 100 may be configured to determine that the user participates in a leisure activity when the tent, breakwater, empty lot, fishing rod, or the like is included in the SVM image. Since a technique of extracting an object in the image is a technique well-known in the art, the details will be omitted.

Furthermore, the power management apparatus 100 may be configured to determine which door of the driver seat door, the passenger seat door, the rear seat door of the electric vehicle is opened based on the open signal received from the door sensor 130. The power management apparatus 100 may be configured to determine the connection (plug in) of the plug to the outlet 170 based on the detection signal received from the plug sensor 140.

The power management apparatus 100 may also be configured to determine whether the smart key is authenticated based on the authentication result obtained from the smart key system 150. In particular, the power management apparatus 100 may be configured to determine whether the smart key is authenticated indoors or outdoors. Notably, indoor authentication refers to authentication of a smart key located at an inside of a vehicle, and outdoor authentication refers to authentication of a smart key located at an outside of a vehicle.

The power management apparatus 100 may be configured to determine a remaining amount of the battery based on the battery information obtained from the BMS 160. In other words, the power management apparatus 100 may be configured to calculate the drivable distance of the electric vehicle based on the remaining amount of the battery, and in response to determining that the calculated drivable distance is equal to the distance from the current location of the electric vehicle to the nearest charging station, the power management apparatus 100 may be configured to block the power supply to the outlet 170. The power management apparatus 100 may be configured to supply or block power to the outlet 170. The power management apparatus 100 may be configured to operate the cluster 180 to indicate that leisure power is being supplied through the outlet 170. The power management apparatus 100 may be configured to operate the buzzer 190 to output a warning sound providing an indication that the leisure power supplied through the outlet 170 has been blocked.

When the input button 200 is pressed or otherwise engaged by the user, the power management apparatus 100 may be configured to determine that the user permits to apply the power to the outlet 170 mounted on the outside of the electric vehicle. The power management apparatus 100 may be configured to stop power supply when a plug-off occurs during power supply through the outlet 170 (e.g., the plug is unplugged), a power supply time set by a user expires, or a blocking signal is received from a smart key. In particular, the blocking signal may be a signal generated when the lock button provided in the smart key is pressed twice (or other similar action).

Figure 2:
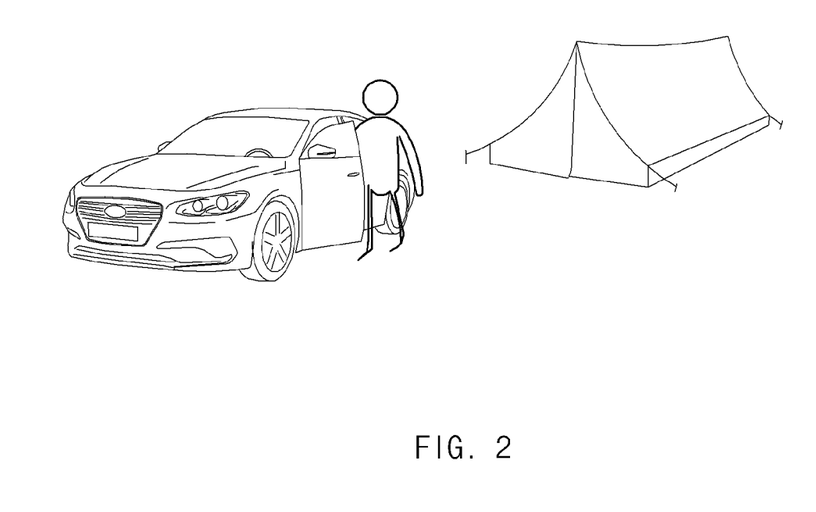
FIG. 2 is a view illustrating an operation performed in a first situation by a power management apparatus for an electric vehicle according to an exemplary embodiment of the present disclosure.

Hereinafter, the operation of the power management apparatus 100 for each situation in the leisure mode will be described in detail with reference to FIGS. 2 to 4. Particularly, the leisure mode refers to a state in which the power management apparatus 100 determines that the user participates in a leisure activity through the AVN system 110 or the SVM system 120. FIG. 2 is a view illustrating an operation performed in a first situation by a power management apparatus for an electric vehicle according to an exemplary embodiment of the present disclosure.

As shown in FIG. 2, the first situation represents a case in which the user opens the driver seat door to use the outlet 170 mounted on the inside of the electric vehicle. First, the power management apparatus 100 may be configured to determine whether the driver seat door is opened based on the detection signal from the door sensor 130. Thereafter, when the outlet 170 is plugged in while monitoring whether the outlet 170 is plugged in through the plug sensor 140, the power may be supplied through the outlet 170. In particular, the power management apparatus 100 may be configured to operate the cluster 180 to indicate that leisure power is being supplied through the outlet 170.

This process allows the user to conveniently use the outlet 170 since the indoor authentication process of the smart key is unnecessary. In particular, the power management apparatus 100 may be configured to calculate the drivable distance based on the remaining amount of the battery obtained using the BMS 160, and in response to determining that the calculated drivable distance is equal to or less than the distance from the current location of the electric vehicle to the nearest charging station, power may not be supplied through the outlet 170.

In addition, the power management apparatus 100 may be configured to block the power supply to the outlet 170 when the drivable distance is equal to or less than the distance from the current location to the nearest charging station during the power supply through the outlet 170. In particular, the power management apparatus 100 may be configured to operate the buzzer 190 to output the warning sound indicating that the leisure power supplied through the outlet 170 is blocked. The power management apparatus 100 may also be configured to stop the power supply when a plug-out occurs during the power supply through the outlet 170, the power supply time set by the user expires, or the blocking signal from the smart key is received.

Figure 3:
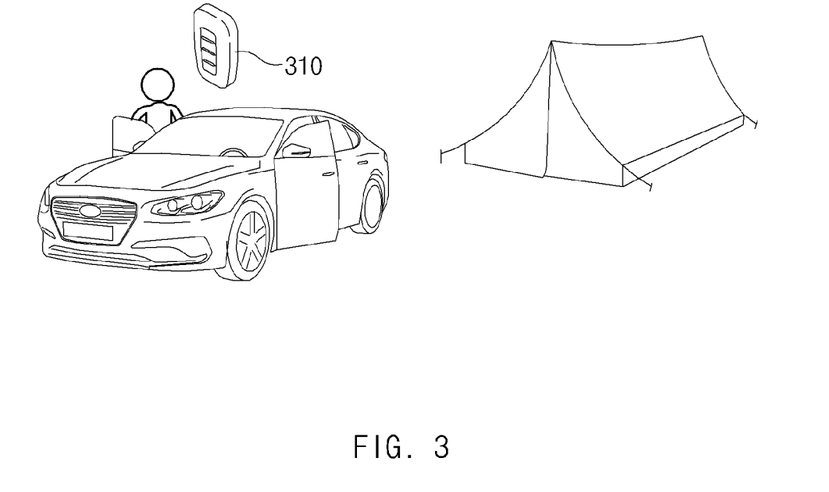
FIG. 3 is a view illustrating an operation performed by a power management apparatus for an electric vehicle according to an exemplary embodiment of the present disclosure in a second situation.

FIG. 3 is a view illustrating an operation performed by a power management apparatus for an electric vehicle according to an exemplary embodiment of the present disclosure in a second situation. As shown in FIG. 3, the second situation represents a case in which the user opens the passenger seat door or the rear seat door to use the outlet 170 mounted on an outside of the electric vehicle. First, the power management apparatus 100 may be configured to determine whether the passenger seat door or the rear seat door is opened based on the detection signal from the door sensor 130.

In addition, the power management apparatus 100 may be configured to receive a message indicating that the indoor authentication of a smart key 310 is successful. Particularly, when the indoor authentication of the smart key 310 fails, the subsequent power supply process may be stopped. By monitoring whether the outlet 170 is plugged in through the plug sensor 140, when the outlet 170 is plugged in, power may be supplied through the outlet 170. The power management apparatus 100 may be configured to operate the cluster 180 to indicate that leisure power is being supplied through the outlet 170. This process allows the user to use the outlet 170 since the process of closing all the doors of the electric vehicle is unnecessary.

Particularly, the power management apparatus 100 may be configured to calculate the drivable distance based on the remaining amount of the battery obtained through the BMS 160, and when the calculated drivable distance is equal to or less than the distance from the current location of the electric vehicle to the nearest charging station, power may not be supplied through the outlet 170. In addition, the power management apparatus 100 may be configured to block the power supply to the outlet 170 in response to determining that the drivable distance is equal to or less than the distance from the current location to the nearest charging station during the power supply through the outlet 170. The power management apparatus 100 may be configured to operate the buzzer 190 to output the warning sound indicating that the leisure power supplied through the outlet 170 is blocked. The power management apparatus 100 may also be configured to stop the power supply when a plug-out occurs during the power supply through the outlet 170, the power supply time set by the user expires, or the blocking signal from the smart key is received.

Figure 4:
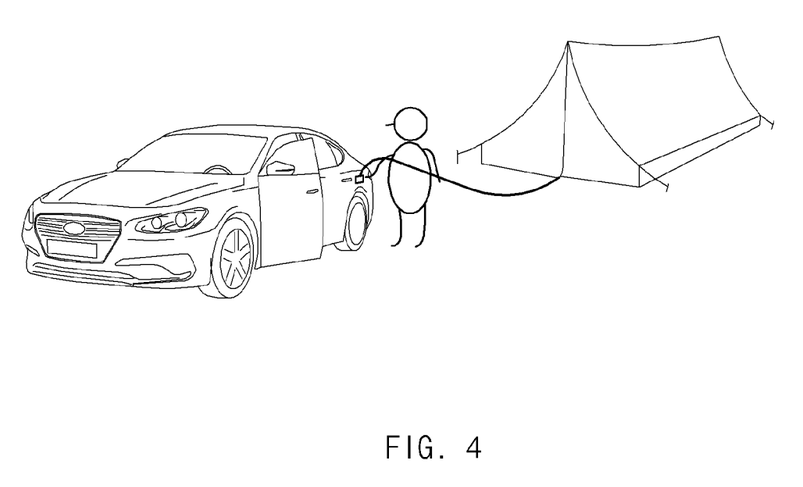
FIG. 4 is a view illustrating an operation performed by a power management apparatus for an electric vehicle according to an exemplary embodiment of the present disclosure in a third situation.

FIG. 4 is a view illustrating an operation performed by a power management apparatus for an electric vehicle according to an exemplary embodiment of the present disclosure in a third situation. As shown in FIG. 4, the third situation represents a case where a user plugs in the outlet 170 mounted on the outside of an electric vehicle. First, the power management apparatus 100 may be configured to identify a plug-in state through the plug sensor 140.

Further, in response to receiving a permission signal from the input button 200 mounted on the inside the electric vehicle, power may be supplied through the outlet 170. In particular, the power management apparatus 100 may be configured to operate the cluster 180 to indicate that leisure power is being supplied through the outlet 170. This process allows the user to use the outlet 170 since the process of closing all the doors of the electric vehicle is unnecessary. The power management apparatus 100 may be configured to calculate the driving distance based on the remaining amount of the battery obtained using the BMS 160, and may not supply power through the outlet 170 in response to determining that the calculated driving distance to the nearest charging station from the current position of the electric vehicle is less than the distance.

In addition, the power management apparatus 100 may be configured to block the power supply to the outlet 170 in response to determining that the drivable distance is equal to or less than the distance from the current location to the nearest charging station during the power supply through the outlet 170. Particularly, the power management apparatus 100 may be configured to operate the buzzer 190 to output the warning sound indicating that the leisure power supplied through the outlet 170 is blocked. In addition, the power management apparatus 100 may be configured to stop the power supply when a plug-out occurs during the power supply through the outlet 170, the power supply time set by the user expires, or the blocking signal from the smart key is received.

Figure 5:
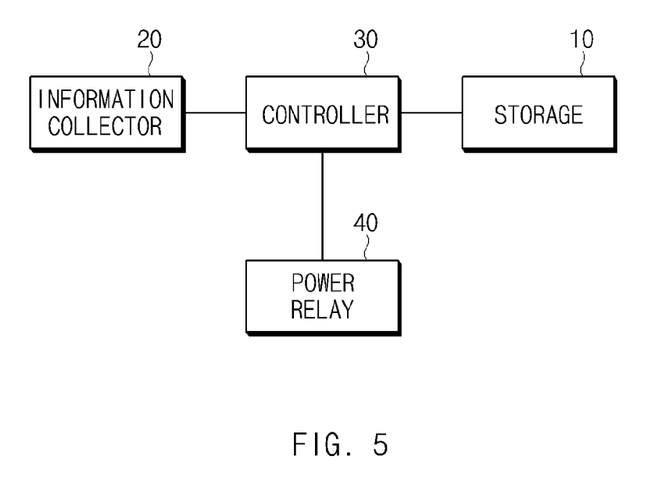
FIG. 5 is a block diagram illustrating a power management apparatus for an electric vehicle according to an exemplary embodiment of the present disclosure.

FIG. 5 is a block diagram illustrating a power management apparatus for an electric vehicle according to an exemplary embodiment of the present disclosure. As shown in FIG. 5, the power management apparatus 100 for an electric vehicle according to an exemplary embodiment of the present disclosure may include storage 10, an information collector 20, a controller 30, and a power relay 40. In particular, according to a scheme of implementing the power management apparatus 100 for an electric vehicle according to an exemplary embodiment of the present disclosure, each component may be combined with each other and implemented as one, or some components may be omitted. The information collector 20 may be integrated into the controller 30.

Regarding each component, first, the storage 10 may be configured to store various logics, algorithms, and programs required for the process of determining whether the user participates in a leisure activity based on the surrounding information of the electric vehicle and supplying power when a plug is connected to the outlet provided in the electric vehicle in the leisure mode entering state.

The storage 10 may be configured to store a program used to calculate the drivable distance of the electric vehicle based on the remaining amount of the battery. The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The information collector 20 may be configured to collect (receive) various types of information from each component as shown in FIG. 1. The controller 30 may be configured to execute the overall control to allow each component to perform its function. The controller 30 may be implemented in hardware or software, and of course, may be implemented in the form of a combination of hardware and software. The controller 30 may be implemented with a microprocessor, but the embodiment is not limited thereto. The controller 30 may be configured to determine whether the user participates in a leisure activity based on the surrounding information of the electric vehicle, and when the plug is connected to the outlet provided in the electric vehicle in a leisure mode entering state, the controller 30 may be configured to perform various controls required in the process of supplying power.

When the user opens the driver seat door to use the outlet 170 mounted on the inside of the electric vehicle, the controller 30 may be configured to determine that the driver seat door is opened based on the detection signal from the door sensor 130. In addition, when the outlet 170 is plugged in while monitoring whether the outlet 170 is plugged in through the plug sensor 140, the controller 30 allows the power to be supplied through the outlet 170. Particularly, the controller 30 may be configured to operate the cluster 180 to indicate that leisure power is being supplied through the outlet 170.

When the user opens the passenger seat door or the rear seat door to use the outlet 170 mounted on the outside of the electric vehicle, based on the detection signal from the door sensor 130, the controller 30 may be configured to determine that the passenger seat door or the rear seat door is opened and receives, from the smart key system 150, a message indicating that the indoor authentication of the smart key 310 is successful. In particular, when the indoor authentication of the smart key 310 fails, the subsequent power supply process may be stopped. Thereafter, the controller 30 may be configured to monitor whether the outlet 170 is plugged in through the plug sensor 140, and allows power to be supplied through the outlet 170 when the outlet 170 is plugged in. The controller 30 may then be configured to operate the cluster 180 to indicate that leisure power is being supplied through the outlet 170.

When the outlet 170 mounted on the outside of the electric vehicle is plugged in by the user, the controller 30 may be configured to determine the plug-in state using the plug sensor 140. In addition, when the permission signal is received from the input button 200 mounted on the inside of the electric vehicle, the controller 30 allows power to be supplied through the outlet 170. In particular, the controller 30 may be configured to operate the cluster 180 to indicate that leisure power is being supplied through the outlet 170.

Meanwhile, the controller 30 may be configured to calculate the drivable distance based on the remaining amount of the battery obtained using the BMS 160, and in response to determining that the calculated drivable distance is equal to or less than the distance from the current location of the electric vehicle to the nearest charging station, the power may not be supplied through the outlet 170. In addition, the controller 30 may be configured to block the power supply to the outlet 170 in response to determining the driving distance is less than the distance to the nearest charging station in the current position of the electric vehicle during the supply of power through the outlet 170. In particular, the controller 30 may be configured to operate the buzzer 190 to output a warning sound indicating that the leisure power supplied through the outlet 170 is blocked.

In addition, the controller 30 may be configured to stop the power supply when a plug-out occurs during the power supply through the outlet 170, the power supply time set by the user expires, or the blocking signal from the smart key is received. The power relay 40 may be configured to supply or block power to the outlet 170 under the operation of the controller 30.

Figure 6:
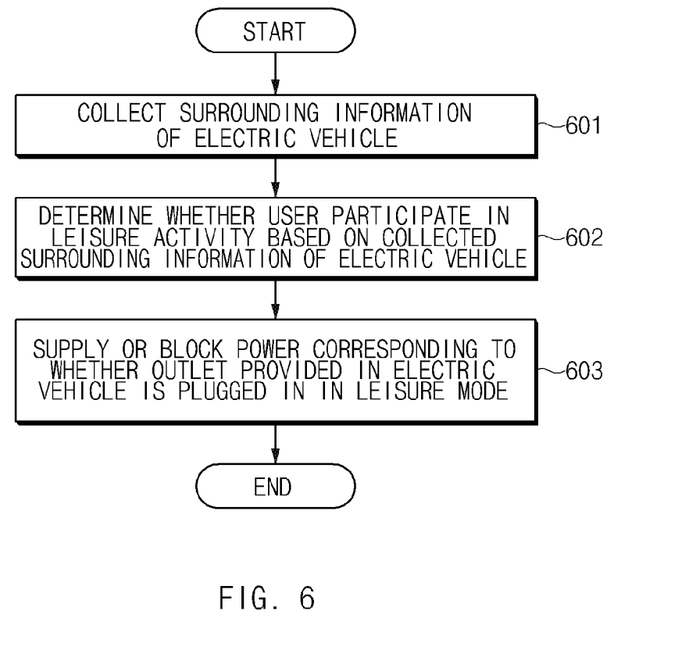
FIG. 6 is a flowchart illustrating a power management method of an electric vehicle according to an exemplary embodiment of the present disclosure.

FIG. 6 is a flowchart illustrating a power management method of an electric vehicle according to an exemplary embodiment of the present disclosure. First, in operation 601, the information collector 20 may be configured to collect the surrounding information of the electric vehicle. Thereafter, in operation 602, the controller 30 may be configured to determine whether the user participates in a leisure activity based on the surrounding information of the electric vehicle collected by the information collector 20. Thereafter, in operation 603, the controller 30 may be configured to operate the power supply based on whether the outlet provided in the electric vehicle is plugged in in the leisure mode indicating that the user participates in a leisure activity.

Figure 7:
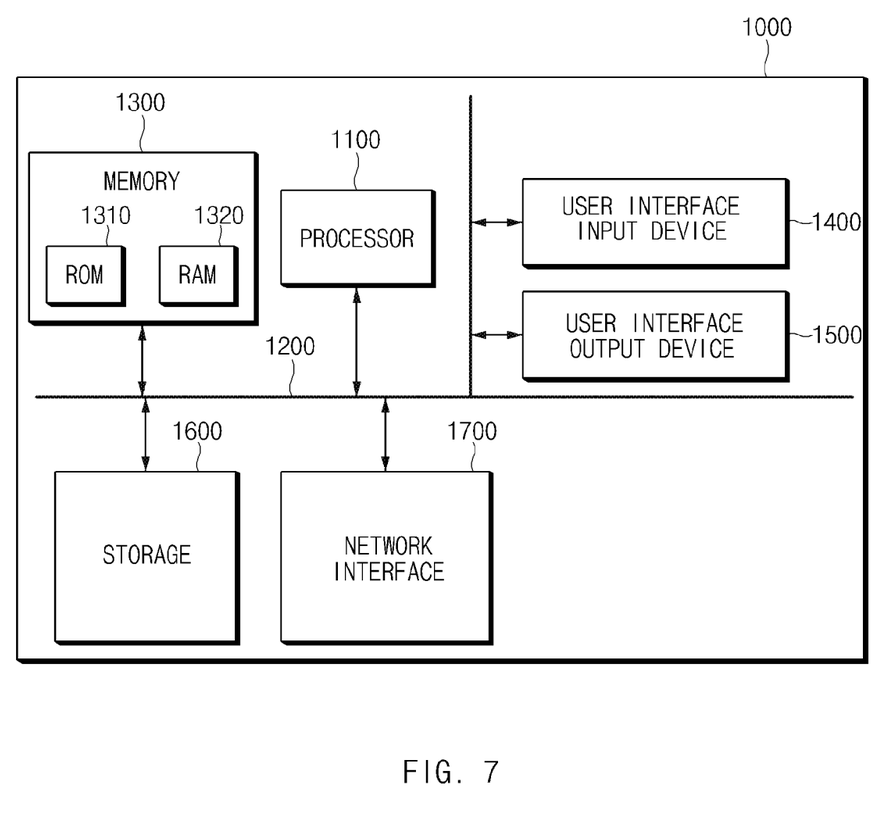
FIG. 7 is a block diagram illustrating a computing system for executing a power management method of an electric vehicle according to an exemplary embodiment of the present disclosure.

FIG. 7 is a block diagram illustrating a computing system for executing a power management method of an electric vehicle according to an exemplary embodiment of the present disclosure. Referring to FIG. 7, as described above, the power management method of an electric vehicle according to an exemplary embodiment of the present disclosure may be implemented through a computing system. A computing system 1000 may include at least one processor 1100, a memory 1300, a user interface input device 1400, a user interface output device 1500, storage 1600, and a network interface 1700, which are connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to apparatus for managing power of an electric vehicle and a method thereof of the embodiments, it may be possible to determine whether a user participates in a leisure activity based on surrounding information of the electric vehicle and supply power when a plug is connected to an outlet provided in the electric vehicle while entering a leisure mode, so that the user may easily use the outlet during leisure activities.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed exemplary embodiments of the present disclosure do not limit the technical spirit of the present disclosure but are illustrative, and the scope of the technical spirit of the present disclosure is not limited by the exemplary embodiments of the present disclosure. The scope of the present disclosure should be construed by the claims, and it will be understood that all the technical spirits within the equivalent range fall within the scope of the present disclosure.

What is claimed is:

1. An apparatus for managing power of an electric vehicle, comprising:
    an information collector configured to collect surrounding information of the electric vehicle; and
    a controller configured to:
        determine whether a leisure activity is being performed by a user based on the surrounding information of the electric vehicle collected by the information collector, and
        adjust power supply based on whether an outlet provided in the electric vehicle is plugged in in a leisure mode indicating that the leisure activity is being performed;
    wherein the surrounding information includes a surrounding image and location information of the electric vehicle; and
    wherein the controller is configured to:
        activate the leisure mode when an object related to the leisure activity is included in the surrounding image of the electric vehicle; and
        activate the leisure mode when the electric vehicle is located at a leisure activity place.

2. The apparatus of claim 1, wherein the outlet is mounted on an inside of the electric vehicle.

3. The apparatus of claim 2, wherein the controller is configured to supply the power to the outlet when a driver seat door is opened and the outlet is plugged in in the leisure mode.

4. The apparatus of claim 3, wherein the controller is configured to output a notification to the user indicating that the power is being supplied to the outlet.

5. The apparatus of claim 3, wherein the controller is configured to block the power supply in response to determining that a drivable distance of the electric vehicle is less than a distance to a nearest charging station while the power is supplied to the outlet.

6. The apparatus of claim 5, wherein the controller is configured to output a notification to the user indicating that the power supplied to the outlet is blocked.

7. The apparatus of claim 3, wherein the controller is configured to stop the power supply in response to receiving a blocking signal from a smart key.

8. The apparatus of claim 2, wherein the controller is configured to supply the power to the outlet when a passenger seat door or a rear seat door is opened in the leisure mode, indoor authentication of a smart key possessed by the user is completed, and the outlet is plugged in.

9. The apparatus of claim 8, wherein the controller is configured to output a notification to the user indicating that the power is supplied to the outlet.

10. The apparatus of claim 8, wherein the controller is configured to block the power supply in response to determining that a drivable distance of the electric vehicle is less than a distance to a nearest charging station while the power is supplied to the outlet.

11. The apparatus of claim 10, wherein the controller is configured to output a notification to the user indicating that the power supplied to the outlet is blocked.

12. The apparatus of claim 8, wherein the controller is configured to stop the power supply in response to receiving a blocking signal from a smart key.

13. The apparatus of claim 1, wherein the outlet is mounted on an outside of the electric vehicle.

14. The apparatus of claim 13, wherein the controller is configured to supply the power to the outlet when the outlet is plugged in and a permission signal is received from an input button mounted on an inside of the electric vehicle.

15. The apparatus of claim 14, wherein the controller is configured to output a notification to the user indicating that the power is being supplied to the outlet.

16. The apparatus of claim 14, wherein the controller is configured to block the power supply in response to determining that a drivable distance of the electric vehicle is less than a distance to a nearest charging station while the power is supplied to the outlet.

17. The apparatus of claim 16, wherein the controller is configured to output a notification to the user indicating that the power supplied to the outlet is blocked.

18. The apparatus of claim 14, wherein the controller is configured to stop the power supply in response to receiving a blocking signal from a smart key.

19. A method of managing power of an electric vehicle, comprising:
    collecting, by a controller, surrounding information of the electric vehicle;
    determining, by the controller, whether a leisure activity is being performed by a user based on the collected surrounding information of the electric vehicle; and
    adjusting, by the controller, power supply based on whether an outlet provided in the electric vehicle is plugged in in a leisure mode indicating that the leisure activity is being performed;
    wherein the surrounding information includes a surrounding image and location information of the electric vehicle; and
    wherein the adjusting the power includes
        activating, by the controller, the leisure mode when an object related to the leisure activity is included in the surrounding image of the electric vehicle; and
        activating, by the controller, the leisure mode when the electric vehicle is located at a leisure activity place.

20. The method of claim 19, wherein the adjusting the power includes:
    supplying, by the controller, the power to an outlet mounted on an inside of the electric vehicle when a driver seat door is opened and the outlet mounted on the inside of the electric vehicle is plugged in in the leisure mode;
    supplying, by the controller, the power to the outlet mounted on the inside of the electric vehicle when a passenger seat door or a rear seat door is opened in the leisure mode, indoor authentication of a smart key possessed by the user is completed, and the outlet mounted on the inside of the electric vehicle is plugged in; and
    supplying, by the controller, the power to an outlet mounted on an outside of the electric vehicle when the outlet mounted on the outside of the electric vehicle is plugged in and a permission signal is received from an input button mounted on the inside of the electric vehicle.

* * * * *